(12) United States Patent
Rugel

(10) Patent No.: US 11,263,698 B1
(45) Date of Patent: Mar. 1, 2022

(54) DETERMINING BODY CHARACTERISTICS BASED ON IMAGES

(71) Applicant: Allstate Insurance Company, Northbrook, IL (US)

(72) Inventor: John Rugel, Hawthorn Woods, IL (US)

(73) Assignee: Allstate Insurance Company, Northbrook, IL (US)

( * ) Notice: Subject to any disclaimer, the term of this patent is extended or adjusted under 35 U.S.C. 154(b) by 120 days.

(21) Appl. No.: 16/555,469

(22) Filed: Aug. 29, 2019

Related U.S. Application Data

(63) Continuation of application No. 14/857,159, filed on Sep. 17, 2015, now Pat. No. 10,438,292.

(51) Int. Cl.
| | | |
|---|---|---|
| *G06Q 40/08* | (2012.01) | |
| *G06K 9/00* | (2006.01) | |
| *H04N 7/18* | (2006.01) | |

(52) U.S. Cl.
CPC ......... *G06Q 40/08* (2013.01); *G06K 9/00362* (2013.01); *H04N 7/183* (2013.01)

(58) Field of Classification Search
CPC .... G06Q 40/08; G06Q 10/04; G06Q 10/0635; G06K 9/00362; H04N 7/183
See application file for complete search history.

(56) References Cited

U.S. PATENT DOCUMENTS

| | | |
|---|---|---|
| 5,832,447 A | 11/1998 | Rieker et al. |
| 6,260,021 B1 | 7/2001 | Wong et al. |
| 7,541,547 B2 | 6/2009 | McGuire et al. |
| 7,613,621 B2 | 11/2009 | Brown |
| 7,895,064 B2 | 2/2011 | Wahlbin |
| 8,024,204 B1 | 9/2011 | Goral |
| 8,483,550 B2 | 7/2013 | Wright et al. |
| 8,793,146 B2 | 7/2014 | Bonissone et al. |
| 9,240,990 B1 | 1/2016 | Ruma |

(Continued)

OTHER PUBLICATIONS

Wen, Lingyun, "Facial Image Analysis for Body Mass Index, Makeup and Identity" (2015). Graduate Theses, Dissertations, and Problem Reports. 6938. https://researchrepository.wvu.edu/etd/6938 (Year: 2015).*

(Continued)

*Primary Examiner* — Elda G Milef
(74) *Attorney, Agent, or Firm* — Dinsmore & Shohl LLP; Ritu Singh

(57) ABSTRACT

System, apparatuses, computer-implemented methods, and computer-readable media executable by insurance system servers and user computing devices for receiving requests for insurance products are provided. In order to determine one or more factors of the insurance product or policy, the system may use body characteristics of the customer or potential customer, such as height, weight, body mass index, and the like. In some examples, this information may be determined from one or more images provided by the user. For instance, one or more images of the customer or potential customer may be captured and transmitted to the system for processing. Based on the received images, the system may determine various body characteristics of the user and may use that information to determine one or more policy factors for the insurance product or policy, such as premium, coverage, term, type of policy, or the like.

20 Claims, 10 Drawing Sheets

(56) References Cited

U.S. PATENT DOCUMENTS

| | | | |
|---|---|---|---|
| 9,839,376 B1* | 12/2017 | Ross | A61B 5/742 |
| 10,748,217 B1* | 8/2020 | Ross | G06Q 50/22 |
| 2003/0200123 A1 | 10/2003 | Burge et al. | |
| 2005/0149350 A1 | 7/2005 | Kerr et al. | |
| 2005/0256392 A1 | 11/2005 | Matory et al. | |
| 2006/0095429 A1 | 5/2006 | Abhyankar et al. | |
| 2011/0004492 A1 | 1/2011 | Bradshaw et al. | |
| 2011/0153351 A1 | 6/2011 | Vesper et al. | |
| 2013/0262155 A1 | 10/2013 | Hinkamp | |
| 2014/0126770 A1 | 5/2014 | Odessky et al. | |
| 2015/0154453 A1 | 6/2015 | Wilf | |
| 2016/0253798 A1 | 9/2016 | Barrett et al. | |

OTHER PUBLICATIONS

"M-commerce security: the impact of wireless application protocol (WAP) security services on e-business and e-health", Joseph Tan, H. Joseph Wen and Tibor Gyires, International Journal of Mobile Communications, vol. 1, Issue 4, 2003.

"Medical Records Studio Version 6.0", Patient Now, downloaded from <http://www.patientnow.com/medical-records-studio-version-6-0/> on Apr. 27, 2015.

"Calculation of Body Mass Index Using Image Processing Techniques", Bipembi et al., International Journal of Artificial Intelligence and Mechatronics, vol. 4, Issue 1, ISSN 2320-5121, Jul. 2015, (Year: 2015).

* cited by examiner

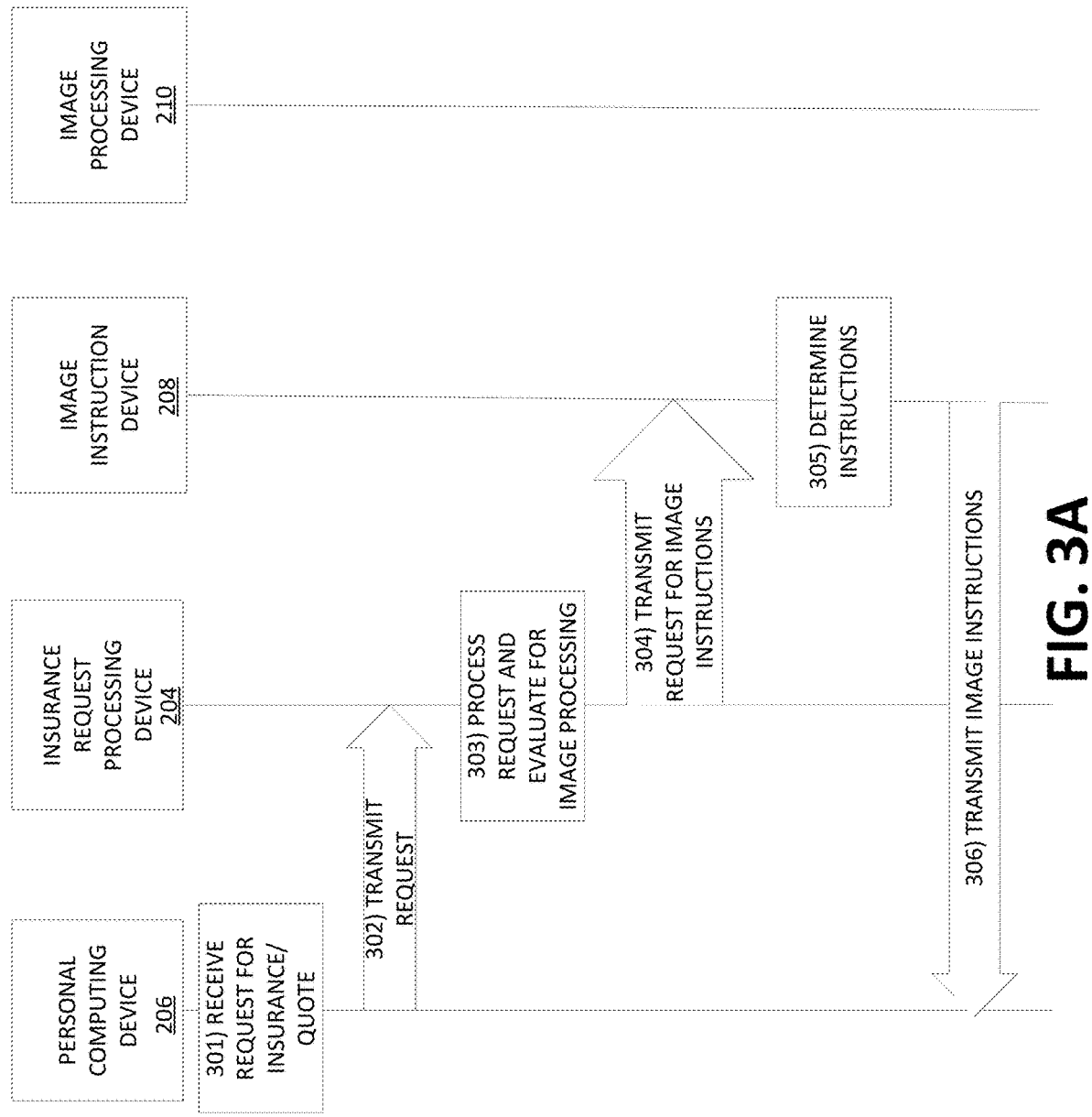

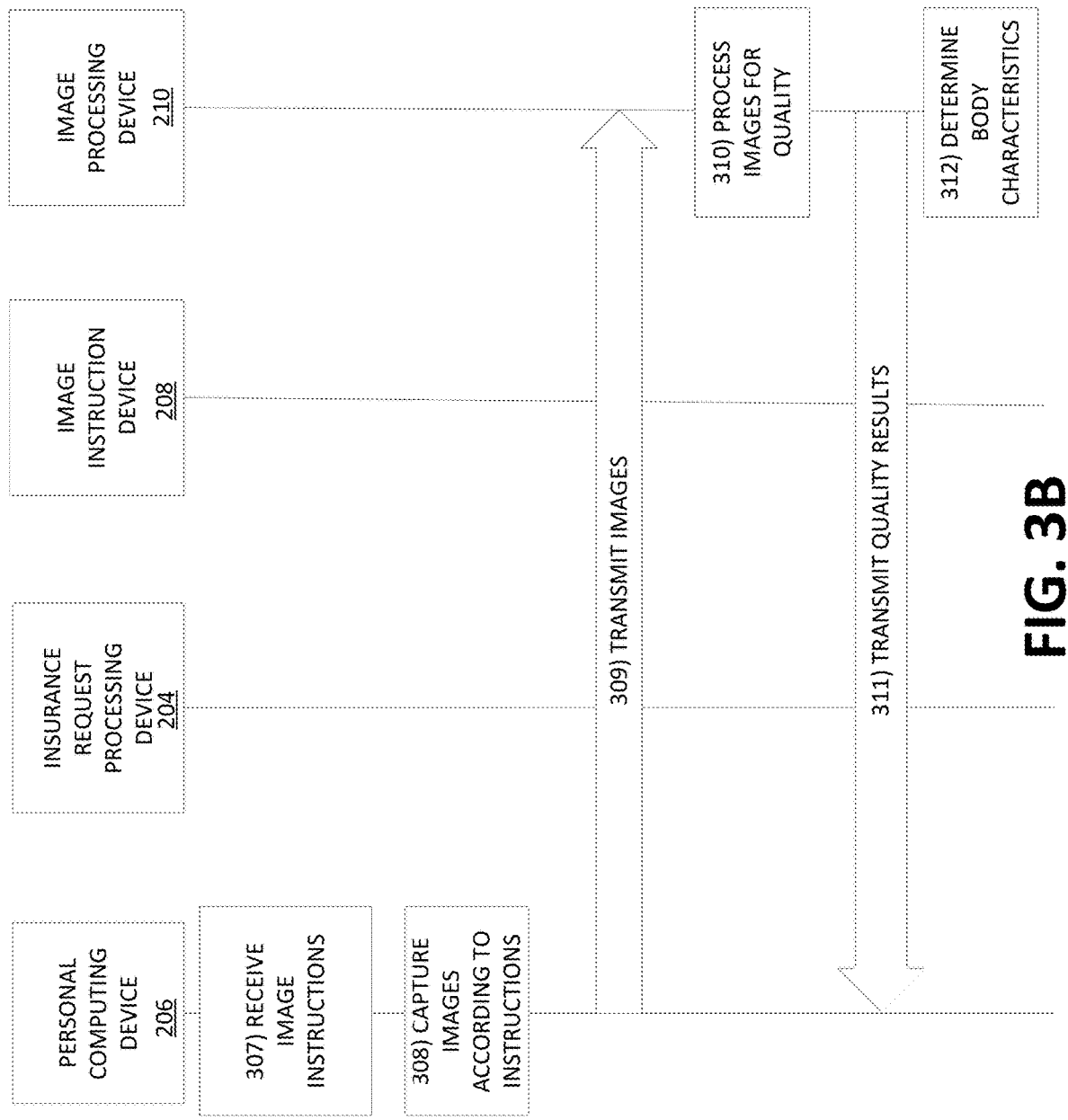

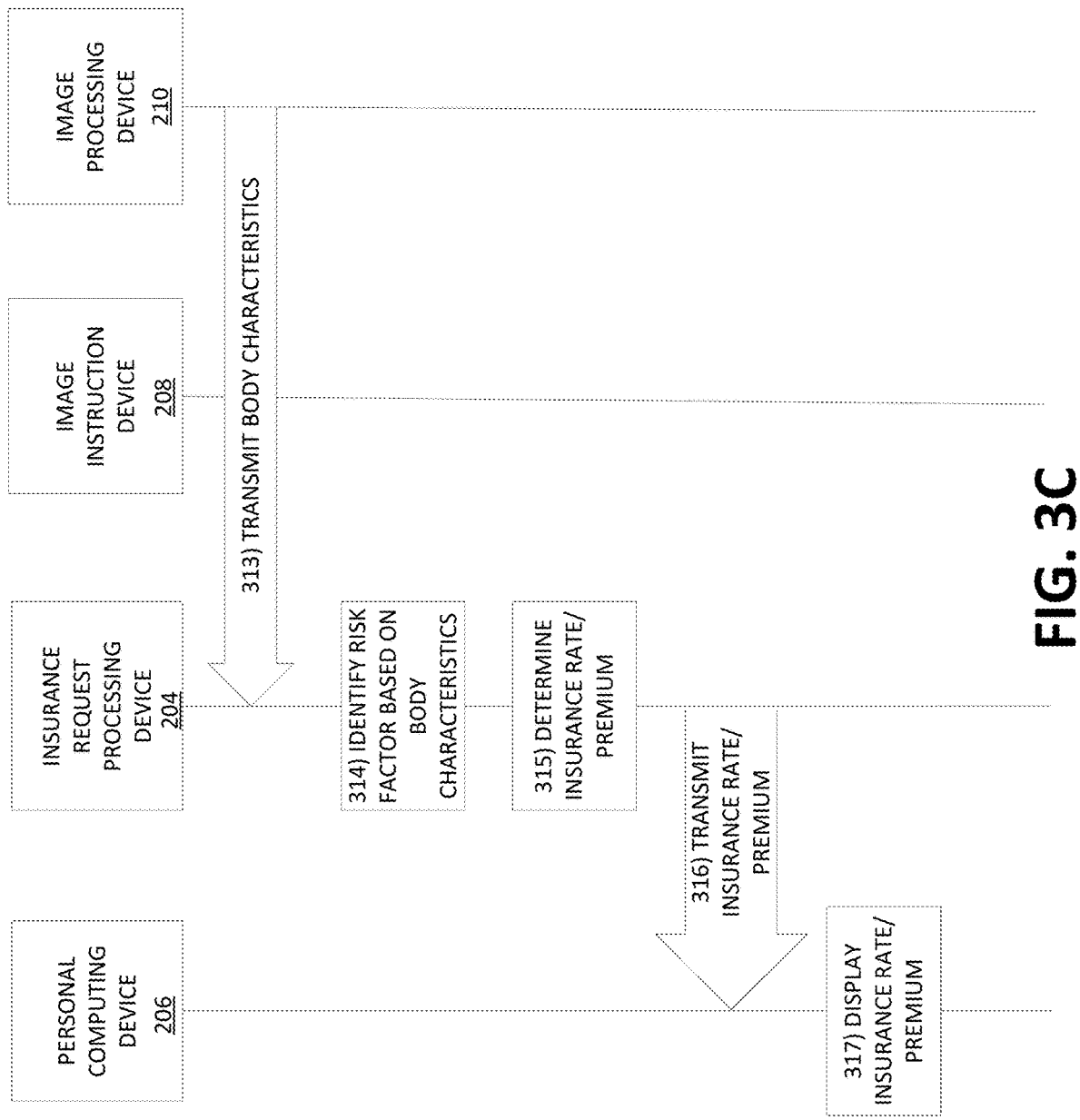

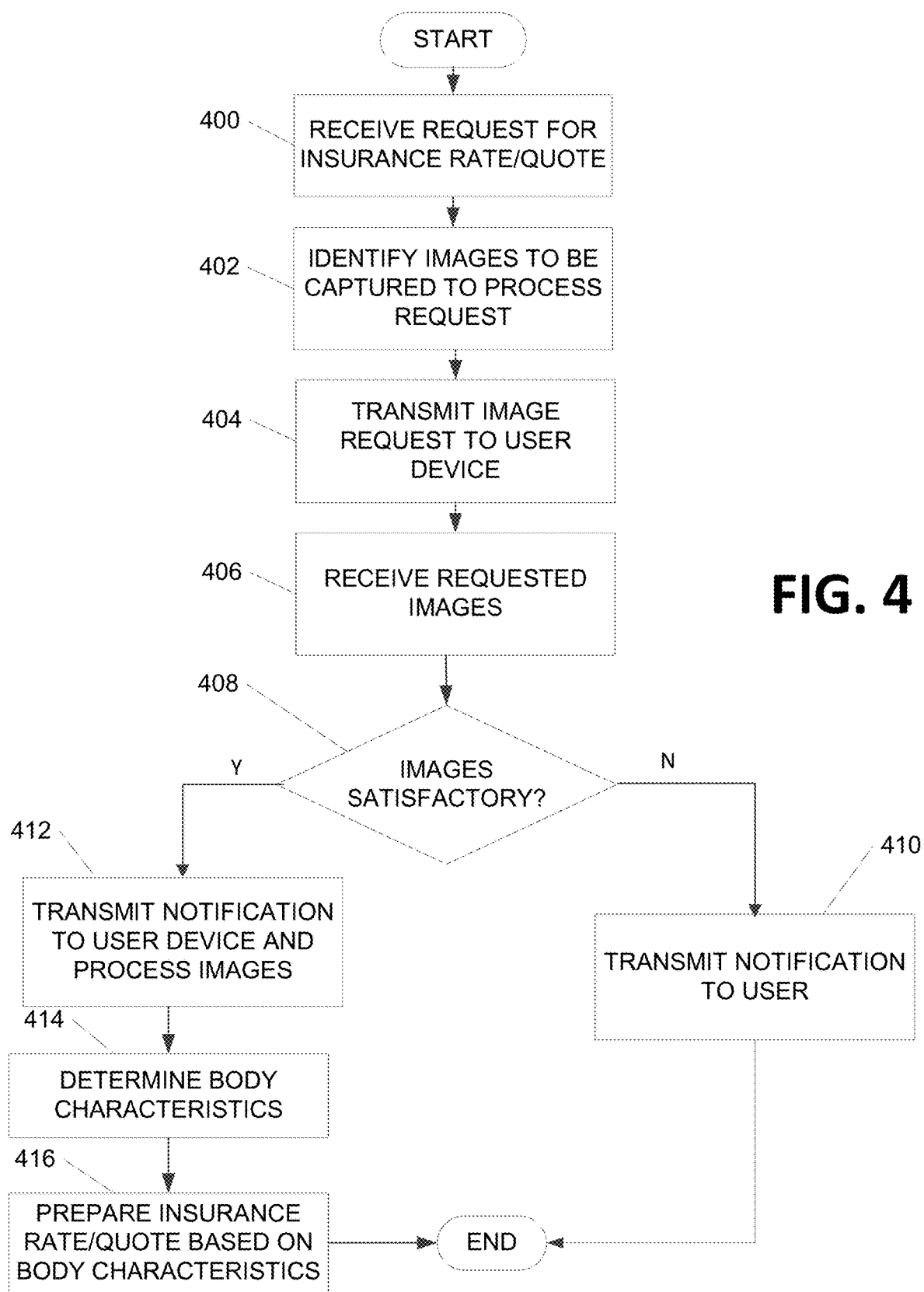

DETERMINING BODY CHARACTERISTICS BASED ON IMAGES

CROSS REFERENCE TO RELATED APPLICATIONS

This application is a continuation of and claims priority to co-pending U.S. application Ser. No. 14/857,159, filed Sep. 17, 2015, and entitled "Determining Body Characteristics Based on Images," which is incorporated herein by reference in its entirety.

TECHNICAL FIELD

Various aspects of the disclosure generally relate to systems and methods of receiving and analyzing images of a user to perform various actions relating to insurance policies and applications based on the analysis of the insurance policy data and/or customer data.

BACKGROUND

Life insurance is not only an important financial tool and investment strategy for many customers, but also provides customers with the security and peace of mind of knowing that they are protecting the financial futures of their families and loved-ones. Many different types of life insurance policies may exist between insurance providers (or insurers) and customers (or insureds), such as term life insurance (providing life insurance protection over a specific period of time), whole life insurance (providing permanent insurance for the lifetime of the insured, generally with fixed terms), or universal life insurance (similar to whole life insurance, with additional flexibility to allow customers to raise or lower premiums and coverage amounts during the lifetime of their policies). Different insurance providers may offer various different types of life insurance products, including different insurance types, terms, premiums, and coverage amounts, to meet the needs and investment goals of different customers.

Insurance providers may determine eligibility of different customers for different life insurance policies and terms (e.g., types, premiums, coverage amounts, term durations, investment flexibility, tax status, etc.), and may offer different policies and terms to different customers, based on various customer information, such as age, gender, income, health, and risk factors. In order to select appropriate life insurance policies and terms for customers, and to determine what policies and terms that different customers may be eligible for, insurance providers may ask customers to provide information related to their current height and weight. This information may be used to determine one or more risk factors associated with the user.

Conventional systems may require verification of the height and weight provided by the user. This verification may include requiring the user to visit an insurance agent, physician's office, or other third party vendor, who may collect this information to verify the information provided by the user. This may be costly and inefficient.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, apparatuses, computer-implemented methods, and computer-readable media executable by insurance system servers and user computing devices for receiving requests for insurance products. In some examples, the insurance product may include a life insurance policy. In order to determine one or more factors of the insurance product or policy, the system may use body characteristics of the customer or potential customer, such as height, weight, body mass index, and the like. In some examples, this information may be determined from one or more images provided by the user. For instance, the system may generate instructions that are transmitted to the user providing information regarding types of images to capture, number of images, and the like. The user may capture the images and transmit them to the system for processing. Based on the received images, the system may determine various body characteristics of the user and may use that information to determine one or more policy factors for the insurance product or policy, such as premium, coverage, term, type of policy, or the like.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 3A-3C illustrate one example event sequence for receiving an insurance product request, receiving requested images, determining body characteristics of the customer or potential customer based on the received images and/or generating an insurance product or offer including a premium based, at least in part, on the body characteristics determined from the received images, according to one or more aspects described herein FIG. 4 is a flow chart illustrating one example method of providing an insurance offer to a user based on images received from the user, in accordance with one or more aspects described herein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
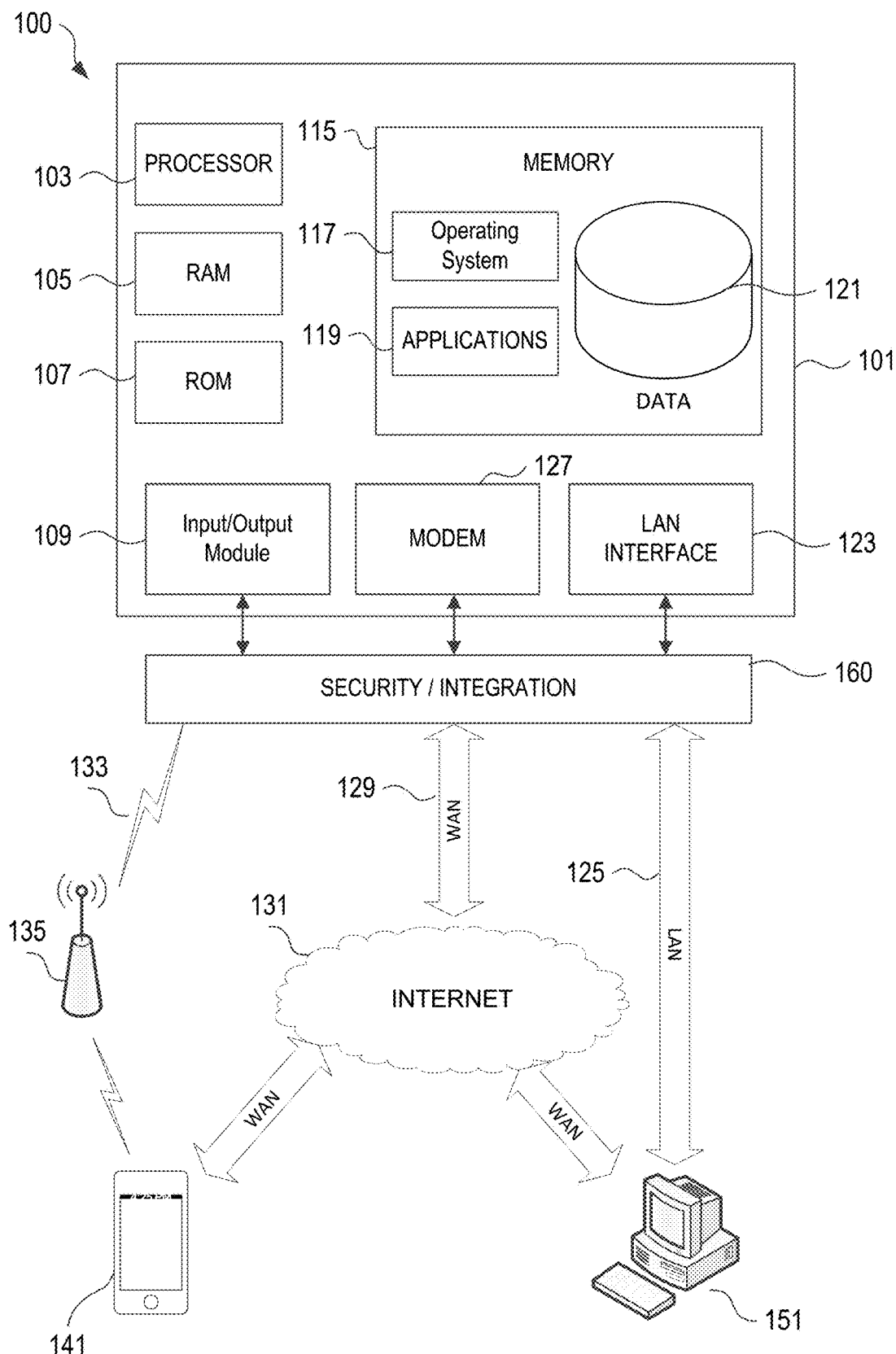
FIG. 1 illustrates computing systems and a network environment that may be used to implement aspects of the disclosure.

FIG. 1 illustrates a block diagram of a computing device (or system) 101 in a computer system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141 and 151, security and integration hardware 160) may correspond to any of multiple systems or devices, such as mobile computing devices, desktop computers, or computer servers, configured as described herein for submitting and processing requests for insurance, such as life insurance, processing received images of an insured customer or potential customer, identifying or determining, based on the received images, one or more body characteristics of the customer or potential customer, and generating one or more insurance products, offers, rates, premiums, or the like, based on the determined characteristics and/or one or more other factors or data.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer readable instructions, data structures, program modules or other data. Certain devices/systems within an insurance system may have minimum hardware requirements in order to support sufficient storage capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., a personal computing device 101, a mobile computing device 101, an insurance server 101, etc.), in order to store and execute an insurance processing software application, to capture and/or receive images of a customer or potential customer, to determine one or more body characteristics of the customer or potential customer, and to generate an insurance policy, rate, premium, or the like, such as a life insurance policy having a particular premium or amount paid by the insured for the policy, based on the received images, as described below. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, to receive and process requests for an insurance policy or quote, identify appropriate image capture instructions, receive and process received images of a customer or potential customer to determine one or more body characteristics of the customer or potential customer, and generate one or more insurance premiums, policies, or quotes, based on the determined body characteristic.

The computing device (e.g., a personal computing device of the customer or potential customer, an insurance system server, etc.) may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, portable computing devices, etc.) via one or more network devices 135 (e.g., base transceiver stations) in the wireless network 133.

Also illustrated in FIG. 1 is a security and integration layer 160, through which communications may be sent and managed between the device 101 (e.g., a personal computing device of a customer or potential customer, an insurance system server, etc.) and the remote devices (141 and 151) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a mobile computing device or a server operated by an insurance provider, financial institution, governmental entity, or other organization, may comprise a set of web application servers configured to use secure protocols and to insulate the server 101 from external devices 141 and 151. In some cases, the security and integration layer 160 may correspond to a set of dedicated hardware and/or software operating at the same physical location and under the control of same entities as server 101. For example, layer 160 may correspond to one or more dedicated web servers and network hardware in an organizational datacenter or in a cloud infrastructure supporting a cloud-based insurance system. In other examples, the security and integration layer 160 may correspond to separate hardware and software components which may be operated at a separate physical location and/or by a separate entity.

As discussed below, the data transferred to and from various devices in the computing system 100 may include secure and sensitive data, such as the confidential personal data of customers or potential customers, images of customers or potential customers, policy information, premium or cost information, and the like. Therefore, it may be desirable to protect transmissions of such data by using secure network protocols and encryption, and also to protect the integrity of the data when stored on in a database or other storage in a personal computing device of the customer or potential customer, an insurance system server, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in a system 100. Data may be transmitted through the security and integration layer 160, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., personal data of the customer or potential customer, images of the customer or potential customer, policy information, etc.) between the various devices 101 in the system 100. Web services built to support system 100 may be cross-domain and/or cross-platform, and may be built for enterprise use. Such web services may be developed in accordance with various web service standards, such as the Web Service Interoperability (WS-I) guidelines. In some examples, a insurance data web service may be implemented in the security and integration layer 160 using the Secure Sockets Layer (SSL) or Transport Layer Security (TLS) protocol to provide secure connections between servers 101 and various clients 141 and 151 (e.g., desktop or mobile devices, insurance servers, data source servers, etc.). SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., an insurance system database, a customer information database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations, such as faster response times and less dependence on network conditions when transmitting and retrieving customer or potential customer data, insurance data, etc., as well as receiving or transmitting software applications or application updates for evaluating received images and determining body characteristics of a customer or potential customer based on the received images.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 119 may be used by the various computing devices 101 within system 100 (e.g., image capture software applications, insurance processing software applications, image processing software applications, etc.), including computer executable instructions for submitting and processing requests for insurance, such as life insurance, transmitting instructions for capturing images, receiving captured images and processing the images to identify one or more body characteristics of the customer or potential customer, and generating an insurance policy offer, premium, quote, rate, etc. based, at least on part, on the body characteristics determined from the received images.

Figure 2:
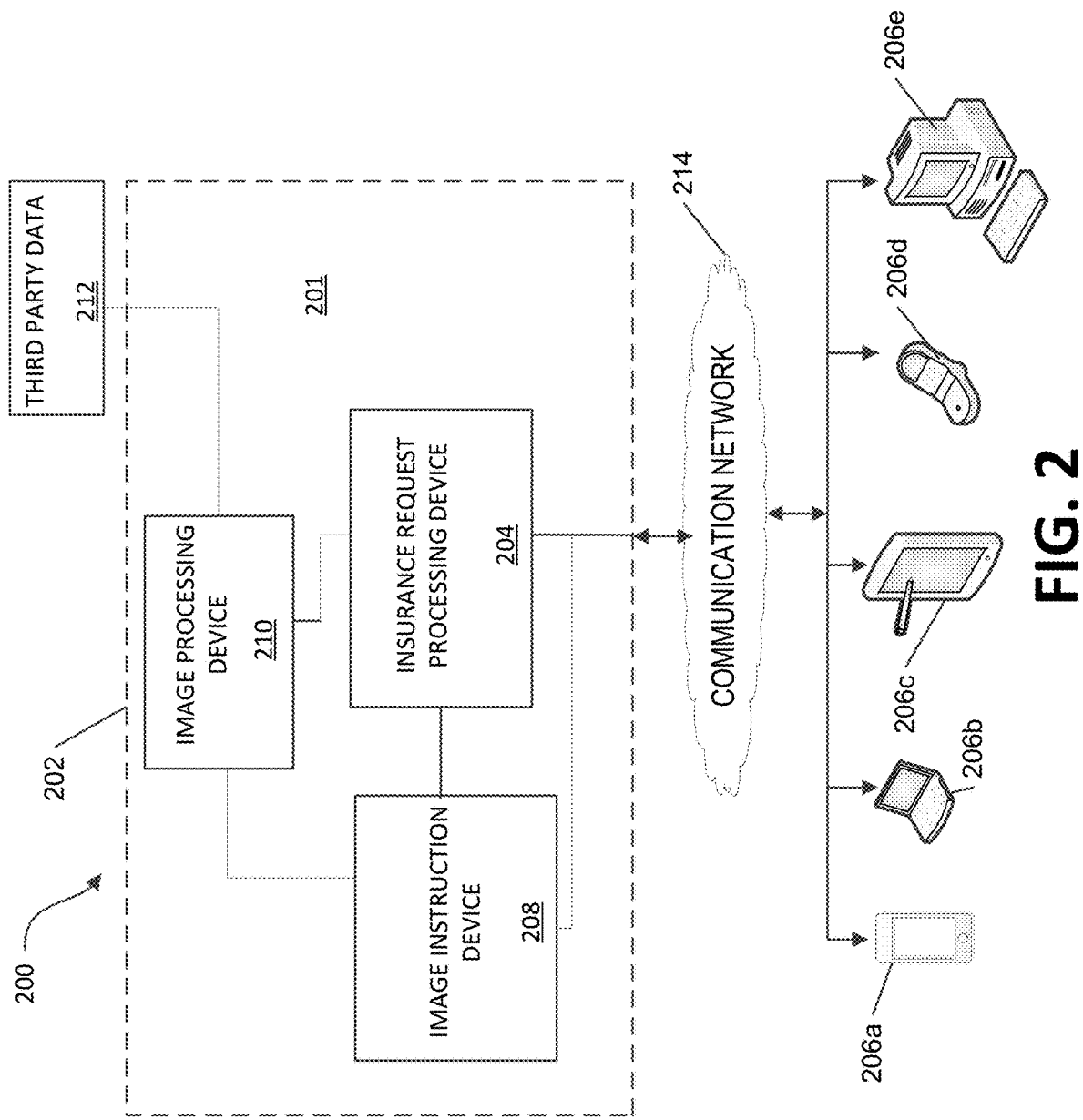
FIG. 2 depicts an illustrative computing environment or system for processing insurance requests and capturing and processing images for use in processing insurance requests, in accordance with one or more aspects described herein.

FIG. 2 depicts an illustrative computing environment or system for processing insurance requests and capturing and processing images for use in processing insurance requests, in accordance with one or more aspects described herein. In some examples, some or all of the devices described with respect to FIG. 2 may be associated with and/or implemented by an entity 202, such as an insurance provider. Entity 202 may be various other types of entities (e.g., government entity, financial institution, university, corporate entity, or the like) without departing from the invention. Various example arrangements described herein will be provided in the context of the entity being an insurance provider, however nothing in the disclosure is intended to limit the entity to only use by financial institutions.

Referring to FIG. 2, insurance system 200 may include one or more computing devices, such as an insurance system server 201, user computing devices 206a-205e, and the like, configured to communicate via communication network 214. The devices shown in system 200 may be configured to communicate via wired or wireless communications via one or more communication networks, such as network 214. The network may be any of the various types of networks described herein.

The insurance system server 201 may include one or more computing devices or components thereof (such as described with respect to device 101 in FIG. 1) and may be contained in a single device or in multiple devices that are connected to or in communication with each other (e.g., wired or wireless communication). In some examples, the insurance system server 201 may include one or more devices including hardware and/or software configured to perform particular functions within the system 200. For instance, insurance system 200 may include an insurance request processing device 204. The insurance request processing device may include hardware and/or software and may be configured to perform particular functions within the system 200 or insurance system server 201. For example, the insurance request processing device 204 may receive a request for a modification to an insurance policy, a request for a new policy, a request for a rate or premium (e.g., an amount the insured will pay for the insurance policy or product) quote, or the like. The request may be received from one or more computing devices, such as device 206a-206e. That is, the request may be received via a smartphone 206a, a laptop computing device 206b, a tablet computing device 206c, a cell phone 206d, and/or any other type of computing device 206e. In some examples, the request may be received via a telephone system. Thus, the processes and systems described herein may be used to address insurance requests may via a network, such as the Internet, via a phone system (e.g., automated system, call center, or the like), insurance agent, or the like.

The insurance request processing device 204 may receive the request and process it to determine whether the request may be expedited. For instance, in some arrangements, a user, such as a customer or potential customer, may be able to provide additional information in order to expedite processing of the insurance request. For example, if a customer or potential customer requests life insurance, the insurance provider may need to consider body characteristics, such as a height, weight, body mass index, or the like, of the customer in order to determine one or more risk factors, insurance premiums, etc. While a user may provide this information to the insurance provider, the insurance provider will, in some examples, verify the information. In conventional systems, this verification may require the customer or potential customer to travel to an agent, physician, or third party provider to record and/or verify these body characteristics. If the customer or potential customer is eligible for expedited processing, the system may then request that the customer or potential customer capture images of himself or herself and transmit the images to the insurance provider. The insurance provider can then determine body characteristics, such as the height, weight, body mass index, etc. from the images.

Determining whether the user is eligible for expedited processing may include asking the user whether they have a device configured to capture one or more images. If so, the user may be eligible for expedited processing. If not the user may use a conventional method of verification.

If the user is eligible for expedited processing, the insurance request processing device 204 may then communicate with an image instruction device 208 to determine a number of images to capture, types of images (e.g., full body shot, face shot, feet, hands, mid-section, or the like), angle of images, environment in which images may be captured (e.g., in a particular sized room, next to an object of known size such as a vehicle, appliance, or the like). Once the image instructions are determined by the image instruction device 208, the instructions may be transmitted to a user via the one or more user computing devices 206a-206e. The user may capture the images, according to the instructions, using, for instance, a camera installed on one of the computing devices 206a-206e. In other examples, the images may be captured by another device, such as a camera separate from the computing device, and transmitted to the insurance system 200 via, for instance, upload from the one or more computing devices 206a-206e.

The images may be received by the system 200 and may be processed by an image processing device 210. The image processing device 210 may include hardware and/or software configured to perform particular functions within the system 200 or insurance system server 201. For instance, the image processing device 210 may analyze the received images for quality to determine whether they meet one or more predefined quality criteria. For instance, the image processing device 210 may determine whether the images are clear or blurry, whether the requisite number of images have been received, whether any instructed angle of the images at which the images should be captured was met, whether the requested portions of the user were captured in the images, and the like. If the image processing device 210 determines that the images do not meet quality criteria, a notification may be transmitted to the user (e.g., via user devices 206a-206e) indicating that the images did not meet the quality standards and requesting additional images or instructing the user to proceed to a conventional method of verifying body characteristics, or any other reasonable next step (e.g., phone an agent).

The image processing device 210 may analyze the images to determine one or more body characteristics of the user. For instance, the image processing device 210 may determine a height, weight, and body mass index of the user, based on the received images. A body mass index is calculated by taking the weight of a person in kilograms and dividing it by the square of the person's height in meters. A body mass index may be considered an indication of a person's body fat and has been used as an indicator of a person's overall health or wellness. The height, weight and/or other body characteristics may be determined using various algorithms, such as comparison between aspects of the environment in which the image was captured, bone structure, facial recognition technology, and the like. The height, weight and/or body mass index information may be transmitted to the insurance request processing device 204 for further processing.

For instance, the insurance request processing device 204 may receive the determined body characteristics and use them to evaluate or determine one or more risk factors associated with insuring the user. For instance, a user having a low body mass index may be generally healthy which may make them a low risk to insure. Accordingly, an insurance policy or product factor, such as an insurance rate or premium, coverage, term, or the like, for that user may be determined based on the low rating for body mass index as a risk factor. In some examples, the determined body characteristics, and/or other risk factors determined based on those characteristics, may be combined with other user data or characteristics, such as age, tobacco use, and the like, to generate an insurance product or offer for the user including a premium or rate based, at least in part, on the body characteristics determined from the images received from the user.

In some examples, the system 200 or insurance system server 201 may be connected to or in communication with one or more third party databases 212. The third party database 212 may include data associated with the user that may, in some examples, be publicly available, or may be accessed by the insurance system server 201 based on permission granted by the customer or potential customer. For instance, the third party database 212 may include data from a department of motor vehicles, transportation safety authority, department of transportation, department of state, or the like, and may include an image of the customer or potential customer, as well as additional customer data. For example, the database 212 may be a department of motor vehicles database and the insurance system server 201 may access the database 212 to retrieve the driver's license data and/or image of the user associated with the driver's license. This data and/or image may be used to verify the identity of the customer or potential customer. That is, if the images from the third party database 212 match (e.g., using facial recognition or other similar technology) the images of provided by the customer or potential customer, the customer or potential customer may be verified and the insurance processing may continue as described herein. If not, a notification may be transmitted to the user (e.g., via devices 206a-206e) identifying the issue and instructing the user on one or more next steps that may be taken (e.g., cancel the request, transmit new images, proceed to third party for conventional verification of body characteristics, or the like.).

These and various other features will be described more fully below.

FIGS. 3A-3C illustrate one example event sequence for receiving an insurance request, receiving requested images, determining body characteristics of the customer or potential customer based on the received images and/or generating an insurance product or offer including a premium or rate based, at least in part, on the body characteristics determined from the received images, according to one or more aspects described herein. The illustrative even sequence shown is merely one example event sequence. Various other steps, events, and the like, may be included without departing from the invention.

In step 301, a request for an insurance product, rate, quote, or the like, is received by a computing device, such as a user computing device 206a-206e. The request may be input via an application running on the mobile device, via an online system associated with the insurance provider, or the like. In some examples, the request may be received via a telephone system and transmitted directed from the telephone to the insurance request processing device.

In step 302, the received request is transmitted to the insurance request processing device. In step 303, the received request is processed and evaluated to determine whether the customer or potential customer is eligible for expedited processing. If so, a request for instructions to capture images may be transmitted to the image instruction device 208 in step 304.

In step 305, instructions for capturing one or more images may be determined by the image instruction device 208. The instructions may include particular areas of the customer or potential customer's body to capture, number of images, angle of images, environment in which the images should be captured, and the like. The instructions may then be transmitted to the user computing device 206 in step 306 and may be displayed on the device.

With reference to FIG. 3B, in step 307, image capture instructions may be received by the user computing device 206 and, in step 308, the images may be captured by the device. In some examples, the customer or potential customer may be able to capture the desired images without assistance using, for example, a camera integrated into the computing device 206. In other examples, a customer or potential customer may have another person capture the images using the device 206. In still other examples, the images may be captured via a camera that is a separate device (e.g., separate from the computing device 206) and the images may be uploaded to the system 200 via one or more computing devices 206.

In step 309, the captured images may be transmitted to the image processing device 210. In step 310, the images may be processed to evaluate a quality of the images and determine whether they meet predefined quality criteria. In step 311, an outcome of the quality evaluation may be transmitted to the user computing device 206. For instance, if the images do not meet the quality threshold, a notification may be transmitted indicating that additional images should be captured or that the images were not sufficient and that the user should proceed to use a conventional system of verification (e.g., visiting a third party vendor, agent, physician, etc. to conduct the verification). If the images do meet the quality threshold, the notification may indicate that the images were received and were sufficient and that the user's request is being processed.

In some examples, upon transmission of the images, the images may be converted into a silhouette, such that only an outline of the individual may be received by the system. Accordingly, the image of the actual body of the customer or potential customer might not be used in the determining. Rather, the silhouette of the user's body may be used to determine the body characteristics.

In step 312, one or more body characteristics of the customer or potential customer may be determined from the received images. For instance, based on the received images, the system may determine an approximate height, weight, and/or body mass index of the customer or potential customer. This information may be determined from bone structure of the user, overall appearance, size relative to a room in which the image was captured, size relative to an object within the image having a known size (e.g., a vehicle (user may provide make and model), an appliance having a relatively standard size, shape, etc., a door or doorframe, a window, or the like. The height and weight may be determined, within a predetermined accuracy and the body mass index may be derived from the determined height and weight. In some examples, if the system is unable to determine or estimate the height and weight to within the predetermined accuracy, the system may notify a user that the images cannot be processed. For instance, if a user is wearing clothing that is so loose fitting the system is unable to judge the body shape, size, etc., the images might be insufficient for processing and the system may notify the user.

In some arrangements, determining a range of height and/or weight may be sufficient to generate the insurance product. That is, risk factors associated with body mass index, height, weight, or other body characteristics, may be determined based on a range. For instance, for a person who is 5 feet, 3, inches tall, a weight within a range of 105 to 135 may be considered healthy. Accordingly, in some examples, the system may determine a range within which the customer or potential customer's height or weight may fall. The system may then categorize the customer or potential customer's height or weight based on this range and the category may be used in generating the insurance product or policy factor.

In some arrangements, transmitting the images may include encoding the images such that only the image data may be stored by the insurance system server 201, but the images themselves might not be stored. That is, the desired information may be derived or determined from the images, and the images themselves might not be stored. Rather, only encoded data representative of the images or information derived from the images may be stored. This may reduce the risk of a customer or potential customer's images being access by an unauthorized source.

With reference to FIG. 3C, in step 313, the determined body characteristics may be transmitted to the insurance request processing device 204 an used to generate the requested insurance product. In some examples, the insurance request processing device 204 may determine a risk or risk factor associated with the body characteristics determined from the received images, as shown in step 314. This risk factor may be on a numeric scale (e.g., 1-10, 1-5, etc.), may be high, low, medium, or the like. This risk factor may then be used, in some examples with other customer data, to generate an insurance product or insurance product offer, including a rate or premium based on the body characteristic data, in step 315.

The insurance product or offer may be transmitted to the user device in step 316 and displayed via the user device in step 317.

FIG. 4 illustrates one example method of providing an insurance offer to a user based on images received from the user, in accordance with one or more aspects described herein. In step 400, a request for an insurance rate or other quote is received by the system. As discussed above, the request may be received from a user computing device, via a telephone system or service, via an agent, or the like. In step 402, the system may identify one or more images of the user that may be used to prepare the insurance quote. In step 404, a request for the identified images may be transmitted to the user and, in step 406, the requested images may be received by the system.

In step 408, a determination may be made as to whether the images meet the predetermined quality threshold. If not, a notification may be transmitted to the user in step 410. The notification may include a request for additional or replacement images, may indicate that the images cannot be processed and the user should use a conventional method of verifying body characteristics, or the like.

If, in step 408, it is determined that the images are satisfactory (e.g., meet the quality threshold), a notification indicating that may be transmitted to the user in step 412 and the images may be processed. In step 414, one or more body characteristics of the user may be determined based on the received images. For instance, a height and weight of the user may be determined from the images and a body mass index may be derived from that information. In step 416, the body characteristics determined from the images may be used to determine or generate an insurance product or offer including a rate or premium based on the determined body characteristics.

In some examples, the images may be the only source of data used to determine height, weight and body mass index of the user. That is, no other person, system, or the like may be used to determine height, weight and body mass index. Instead, those body characteristics may be determined only from the received images. In other examples, the body characteristics determined from the images may be used to confirm or verify body characteristic data input by the user.

Figure 5:
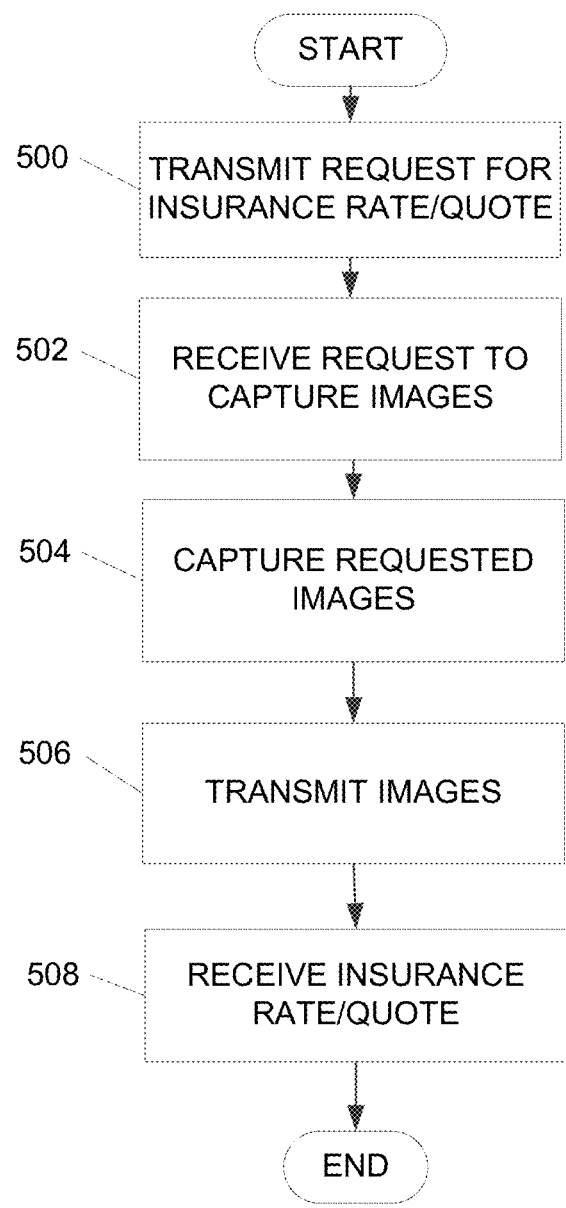
FIG. 5 illustrates one example method of capturing images for use in generating an insurance product or offer according to one or more aspects described herein.

FIG. 5 illustrates one example method of capturing images for use in generating an insurance product or offer according to one or more aspects described herein. In step 500, a request for an insurance quote or product may be transmitted. In some examples, the request may include a request for life insurance. In step 502, a request to capture images of the customer or potential customer may be received. The request may include instructions indicating a number of images, particular parts of the body to capture, particular angle of the images, and the like.

In step 504, the requested images may be captured by the user. As discussed herein, the images may be captured via a camera integrated into a user computing device (e.g., a smartphone camera, or the like), or may be captured via a separate camera device and uploaded to the system via the user computing device. In step 506, the images may be transmitted for further processing. In some examples, the images may be transmitted to, for instance, the insurance system server for further processing. In other examples, some or all of the processing may be performed on the user computing device (e.g., via one or more applications configured to process the images captured as described herein). In still other examples, a portion of the image processing may be performed on the user computer device and a portion at the insurance system server.

In step 508, an insurance product or offer may be received. The insurance product or offer may include a rate or premium based on body characteristics determined from the images captured by the user.

Figure 6:
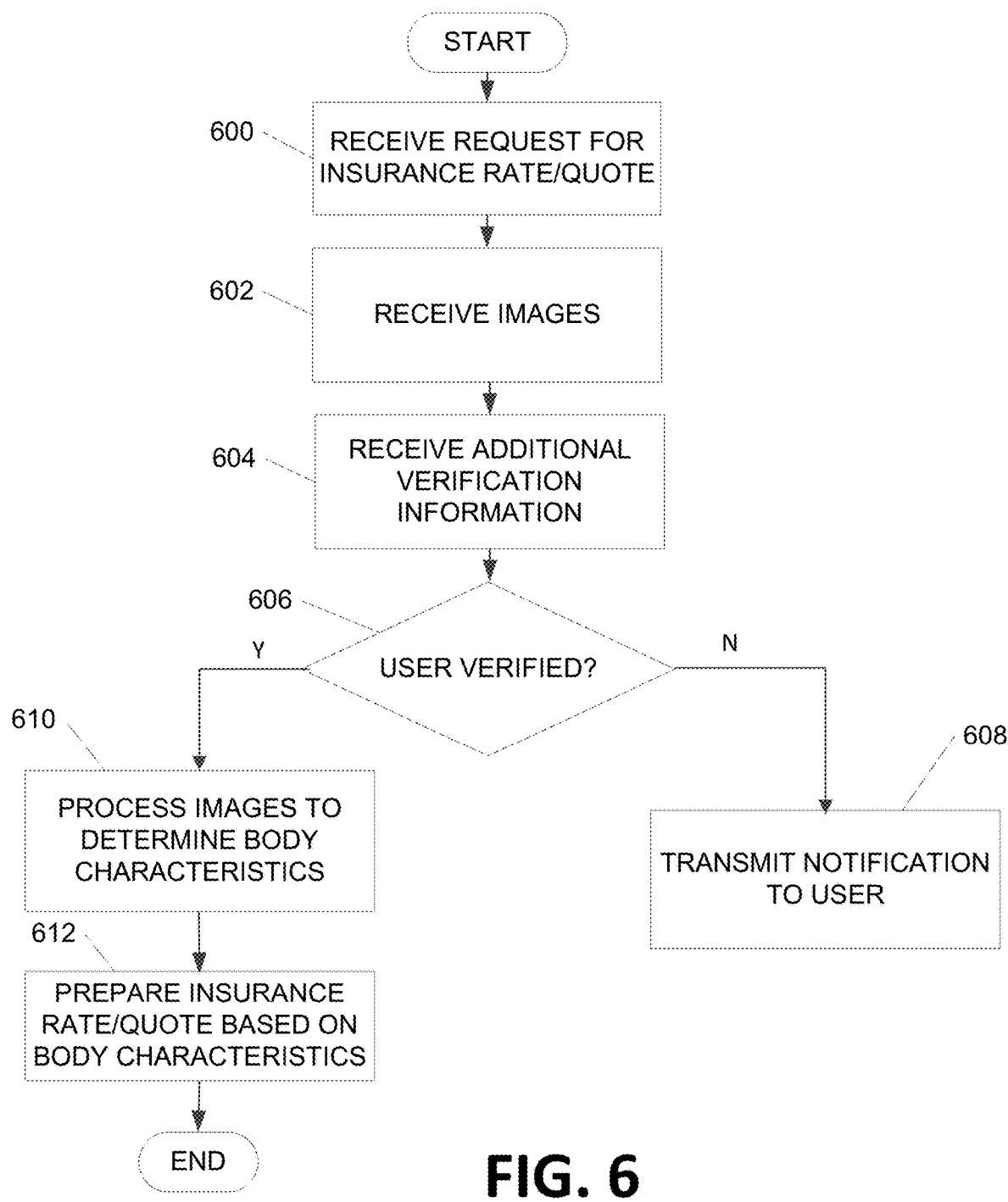
FIG. 6 illustrates one example method of verifying an identity of the customer or potential customer prior to processing the received images to generate the insurance product or offer, according to one or more aspects described herein.

FIG. 6 illustrates one example method of verifying an identity of the customer or potential customer prior to processing the received images to generate the insurance product or offer, according to one or more aspects described herein. In step 600, a request for an insurance product or rate quote may be received similar to step 400 in FIG. 4. In step 602, images of the customer or potential customer may be received. The images may be received in a manner similar to those discussed above with respect to FIGS. 2-5 and one or more steps processed discussed with respect to those figures may be included in the process described in FIG. 6.

In step 604, additional verification information about the customer or potential customer may be received. In some examples, the additional verification information may include an image of the customer or potential customer. In some examples, the additional verification information may be received from a third party (such as third party database 212 in FIG. 2) and may include an image, such as a driver's license image of the customer or potential customer. In other examples, the additional verification information may be received from the user. For instance, the user may capture an image of, for instance, a driver's license, passport, or other photo identification. This image may be transmitted to the system with the other images of the customer or potential customer and may be used to verify the identity of the customer. This may aid in preventing fraud or other unauthorized use of the system to obtain insurance. The user's driver's license, passport or other government issued identification may also be used in determining height and weight (e.g., from an image) since the images on those forms of identification captured in a consistent manner (e.g., same or similar angle, same or similar size, etc.). This consistency may aid in determining a height and/or weight from the images.

In step 606, a determination is made as to whether the user is verified. For instance, the system may determine whether a match exists between an image of the user and the additional verification information. If not, a notification may be transmitted to the user in step 608. The notification may include an indication that the identity of the user could not be verified and may offer options for next steps (e.g., cancel the request, visit an agent to further process the request, visit a physician, third party vendor, or the like, to verify identity and body characteristics, etc.).

If the user is verified in step 606, the images may be processed in step 610 to determine one or more body characteristics. Processing the images may include one or more aspects of image processing discussed above with respect to FIGS. 2-5. In step 612, an insurance product or offer may be generated based, at least in part, on the determined body characteristics, and the offer may be transmitted to the user.

Figure 7:
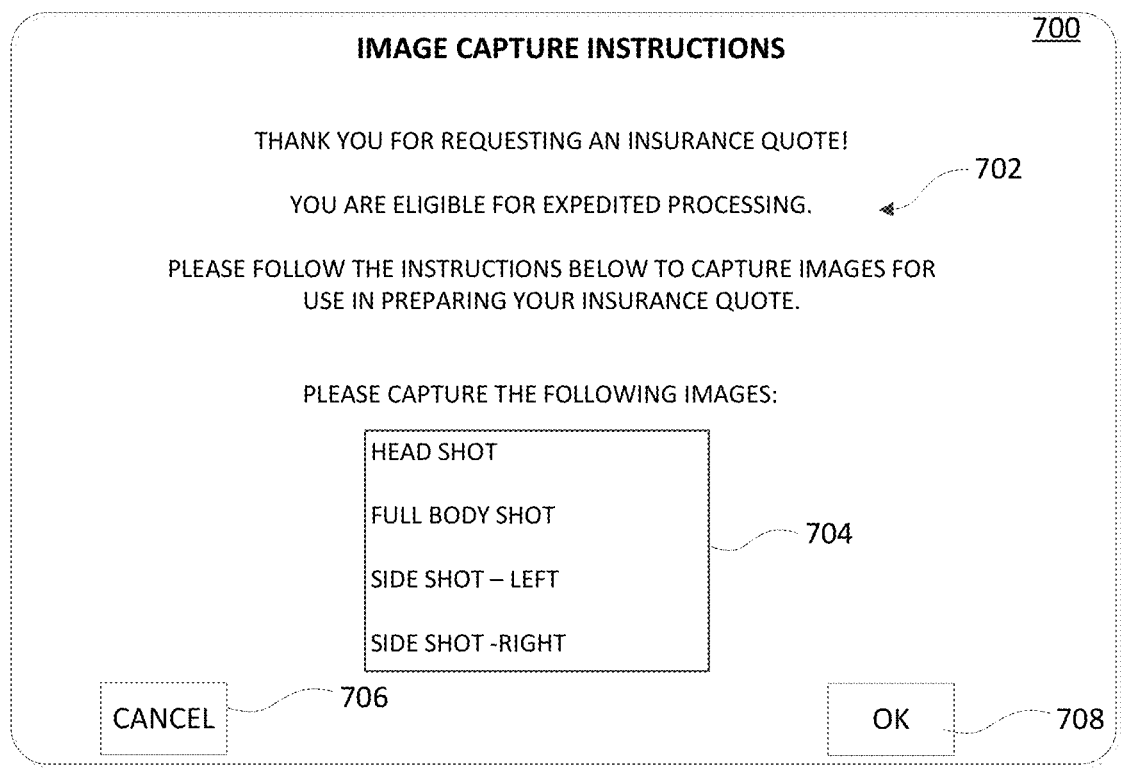
FIG. 7 illustrates one example user interface for providing image capture instructions to a customer or potential customer according to one or more aspects described herein.

FIG. 7 illustrates one example user interface providing image capture instructions to a customer or potential customer, according to one or more aspects described herein. The interface 700 includes region 702 in which the user may be informed that he or she is eligible for expedited processing and that additional instructions are provided below.

The interface 700 further includes region 704 in which image instructions are provided to the user. For instance, region 704 may include particular types of images the user should capture in order to process the insurance request. Region 704 includes types of images such as a head shot, full body shot, side shot—left and side shot-right. Various other types of images may be provided in region 704 without departing from the invention. For instance, an image of the back of the user may be requested. Also, instructions regarding the angle of the image may be provided. In still other examples, the instructions may include instructions regarding an environment in which to capture one or more images. For instance, the instructions may include an instruction to capture a full body image of the customer or potential customer standing next to his or her vehicle. Accordingly, the vehicle may provide a reference point when determining height and/or weight of the user.

If the user no longer wishes to process the insurance request, or process the insurance request in this manner, the user may select "CANCEL" option 706 to cancel the request. Alternatively, the user may select "OK" option 708 to acknowledge the instructions and continue with capturing the requested images.

Figure 8:
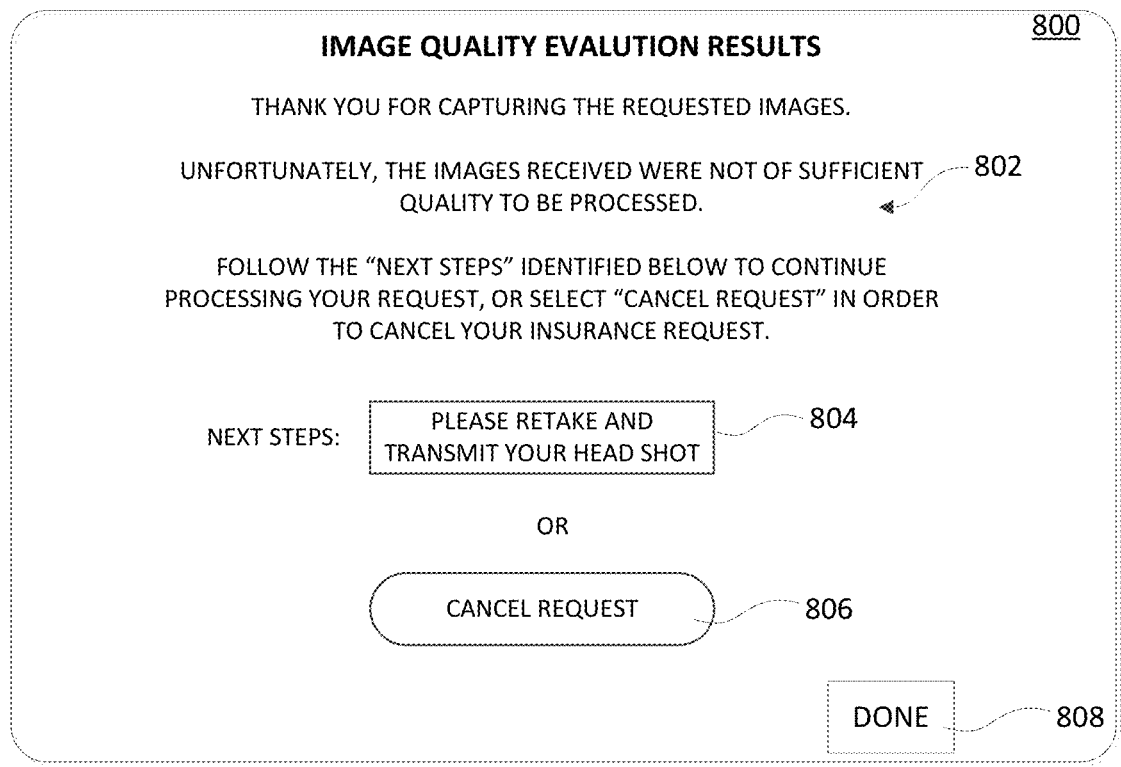
FIG. 8 illustrates one example user interface for providing a notification to a user that the images captured are not sufficient according to one or more aspects described herein.

FIG. 8 illustrates one example user interface for providing a notification to a user that the images captured are not sufficient, according to one or more aspects described herein. User interface 800 includes a region 802 in which the user is notified that the images captured are not of sufficient quality to meet the quality threshold in order to process the images. For instance, the images may be blurry, too dark, too light, may not capture the desired or instructed portions of the customer or potential customer's body, and the like. Accordingly, the system has determined that the images do not meet quality standards to further process the images and the user's insurance request and thus notifies the user.

The interface 800 may further include potential next steps for the user. For instance, one or more next steps may be provided in field 804. In FIG. 8, field 804 indicates that a potential next step is to re-capture a head shot of the customer or potential customer. Various other next steps may be provided to the user in field 804 or in various other fields, interfaces, etc. For instance, the user may be instructed to re-capture all images, or the user may be instructed to capture additional images that were not previously captured, or the like. Alternatively, the user may elect to cancel the insurance request by selecting "CANCEL REQUEST" option 806. This may cancel the user's insurance request and not further action may be taken with respect to the request.

When the user is finished viewing interface 800, the user may select "DONE" option 808. Selection of this option may cause one or more additional interfaces to appear in which a user may receive additional instructions for completing the next steps.

Figure 9:
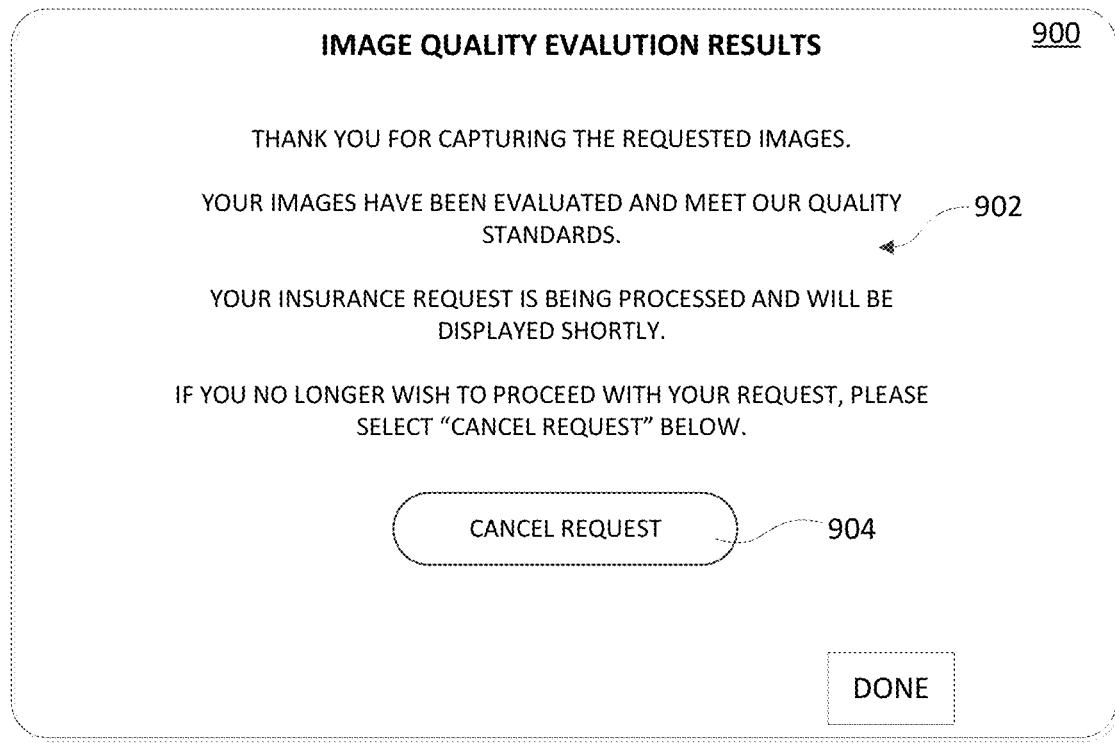
FIG. 9 illustrates one example user interface for providing a notification to the user that the captured images are of sufficient quality according to one or more aspects described herein.

FIG. 9 illustrates one example user interface providing a notification to the user that the captured images are of sufficient quality, according to one or more aspects described herein. The interface 900 includes region 902 in which the user is notified that the images have been evaluated and meet the desired quality standards. In addition, region 902 may indicate that the user's insurance request is being processed. Interface 900 may also provide an option 904 to cancel the insurance request. Selection of option 904 may cancel the user's request for an insurance product or quote and may cause deletion of any customer data, images, or the like, associated with the insurance product request.

Figure 10:
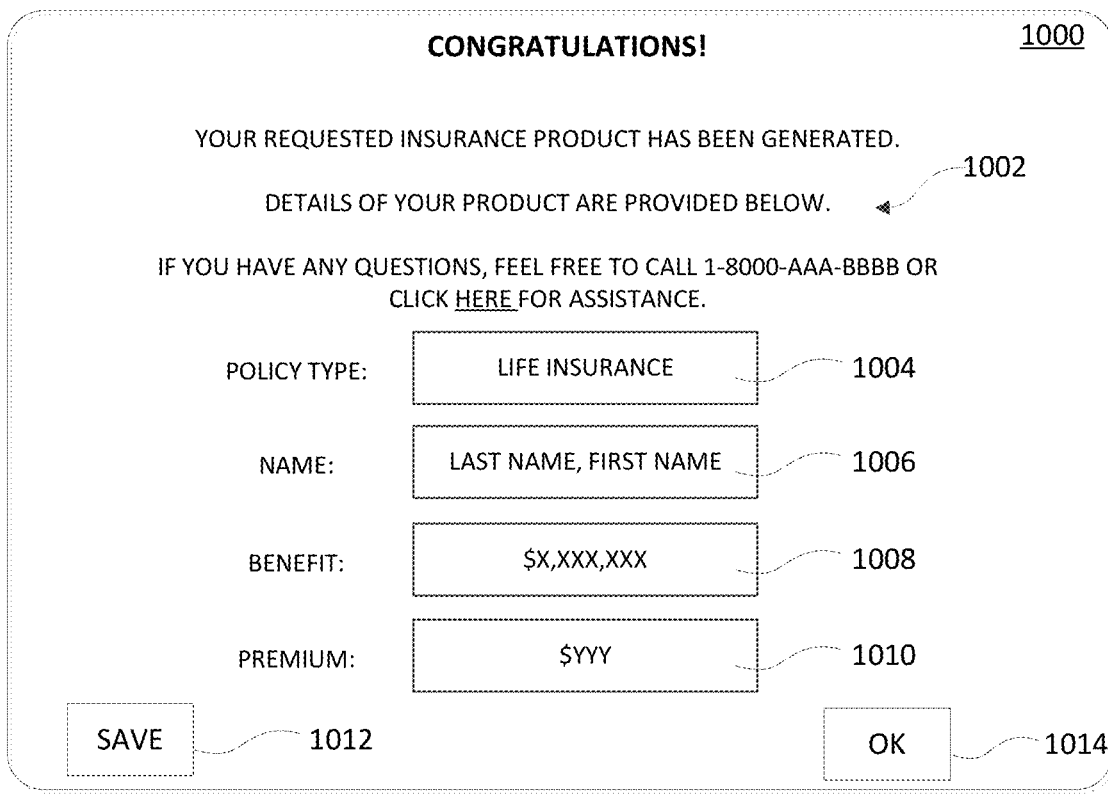
FIG. 10 illustrates one example user interface for providing details of the insurance product generated using body characteristics determined from the captured images according to one or more aspects described herein.

FIG. 10 illustrates one example user interface providing details of the insurance product generated using body characteristics determined from the captured images. Interface 1000 includes region 1002 in which the user is given an indication of the product and includes options for providing assistance. In field 1004, the type of insurance product may be identified. In field 1006, a name of the insured (or potential insured) is provided. In field 1008 an amount of a benefit is provided and in field 1010, a premium or insurance rate may be provided. The user may then select "OK" option 1014 to continue to accept the offer and finalize purchase of the policy, or may select "SAVE" option 1012, to save the generated offer for later.

Various other fields and types of information may be provided in any of the interfaces described herein without departing from the invention. The information shown in each interface are merely examples of some information and arrangements of information that may be provided to the user.

As discussed herein, the systems and arrangements described provide an efficient way to obtain an insurance product or quote. In some examples, the image capture aspect described herein may reduce or eliminate the need for a user to have body characteristics, such as height and weight, verified prior to obtaining the insurance product or quote.

In other aspects, determining the height, weight, or other body characteristics from the images provided may be used in obtaining other types of insurance, such as health insurance. The arrangements described herein may also be used during a potential employment evaluation for positions in which specific height or weight requirements exist (e.g., law enforcement, military service, customs and border patrol, and the like). Rather than requiring a potential employee to travel to a location to have his or her height and weight verified, the potential employee may capture images, as discussed herein, and the height and weight may be determined from the captured images and used in the employment decision making process.

As discussed herein, the height and weight may be determined from one or more images captured by the user (e.g., via a camera integrated into a user computing device, a separate camera device, or the like). In some examples, additional devices may be used, such as a gaming system. In still other examples, video images may be provide to the system and may be used in determining a height and weight. In some arrangements, a user may be conducting a video call with, for example, an insurance agent. During the video call, the agent may ask permission of the customer to capture one or more images from the video stream. If the customer grants permission, the desired images of the customer may be captured or extracted from the video stream and used to generate the insurance product or offer.

As discussed herein, the images captured may be captured in an environment that provides additional perspective regarding relative size. For instance, a user may capture his or her image next to a door or doorframe (which typically has a standard size), next to his or her vehicle (which may have known dimensions), or next to a window, appliance, or other item having known dimensions. The size of a room may also be inferred from the images and used to determine a height and weight of the user, which is then used in the insurance product or offer.

In some examples, an overall health appearance of the user may also be determined from the images. That is, a general observation of the health of a person may be determined and, if the user appears to have additional health risk factors (e.g., has a generally unhealthy appearance), the user may be instructed to proceed through conventional channels to complete the process of obtaining the insurance product. In another example, if the height and weight of the user are determined from the images to indicate a highly unhealthy person (e.g., the user is substantially below weight for his or her height), the user may be instructed to proceed through conventional channels to complete the process in order to more fully evaluate the user and any potential health issues.

As discussed herein, the system may also aid in reducing instances of fraud. That is, in arrangements in which the customer or potential customer's identity is verified, any potential instances of fraud may be identified early in the process and fraudulently obtained policies may be identified at an early stage or before being issued.

In still other examples, data collected from a wearable device of the user may be used in conjunction with the images to assess additional risk factors or health levels of the user. For instance, real-time biometric data, activity data, and the like, of the user may be collected (e.g., via a wearable device and with permission of the user) and used in conjunction with the determined height and weight to generate the insurance product or offer. Various other customer data may be used in the process as well, such as driving records, credit score, and the like (with permission from the user).

Additional aspects of the systems and arrangements described herein may be part of an incentive to obtain insurance. For instance, users who are willing to provide the requested images may be able to bypass other portions of an underwriting process associated with obtaining an insurance product, etc. For instance, a user may be able to bypass providing samples of bodily fluids (e.g., blood, urine, etc.) if willing to use the image capture system described herein. In some examples, users must have a height and/or weight determined from the images to be within a predefined threshold range in order be eligible to bypass the other portions of the underwriting process. This may speed the process of obtaining insurance.

The processes and arrangements discussed herein may be performed via an online system and/or via an application running on a computing device. For instance, a user may download an app to his or her mobile device that may be used to facilitate the insurance product request, capturing of images, etc. The app may display the instructions to the user and, in some examples, may control use of the camera in order to ensure that images are captured at appropriate angles, that a distance of the user from the camera is sufficient, etc. The app may then facilitate transmission of the images to the insurance system server (or may process the images directly) to determine the height and weight and/or to generate the insurance product or offer.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system comprising:
    at least one processor;
    a communication interface communicatively coupled to the at least one processor;
    and a memory storing computer-executable instructions that, when executed by the at least one processor, cause a user computing device to:
        execute an application on the user computing device, executing the application including:
        transmitting a request for an insurance product to an insurance system server;
        receiving, from the insurance system server, instructions to capture at least one image of a customer or potential customer, the instructions including identification of the at least one image including the customer or potential customer and an object having a known size;
        executing the received instructions and capturing the at least one image based on the received instructions;
        converting the captured at least one image to a silhouette of the customer or potential customer;
        transmitting the converted, captured at least one image to the insurance system server for verification of an identity of the customer or potential customer and determination of a height and a weight of the customer or potential customer determined from the at least one image;
        receiving, responsive to the transmitting, an insurance policy factor based, at least in part, on the height and the weight of the customer or potential customer determined from the at least one image; and
    the insurance system server further including instructions that, when executed, further cause the insurance system server to:
        receive the transmitted at least one image;
        prior to processing the received at least one image, verify an identity of the customer or potential customer;
        process the received at least one image to determine a height and a weight of the customer or potential customer from the at least one image; and
        determine an insurance policy factor based, at least in part, on the determined height and weight, for the insurance product.

2. The system of claim 1, wherein the object having a known size is at least one of: a door frame, a door and a vehicle.

3. The system of claim 1, wherein the determined insurance policy factor is further based on a body mass index of the customer or potential customer determined based on the height and the weight determined from the at least one image.

4. The system of claim 1, wherein verification of an identity of the customer or potential customer further includes:
    receiving a captured image of a government issued identification; and
    verifying the identity of the customer or potential customer by comparing the captured image of the government issued identification to additional information.

5. The system of claim 1, wherein the instructions to capture the at least one identified image include instructions to capture a plurality of images of the customer or potential customer and instructions regarding at least one of: body part to capture in at least one image, angle of capture of at least one image, and environment in which at least one image is captured.

6. The system of claim 5, wherein the instructions regarding a body part to capture include at least one of a full body image, a side image, and a head or face image.

7. The system of claim 1, further including instructions that, when executed, cause the user computing device to:
    encode the at least one image to generate encoded information derived from the at least one image.

8. The system of claim 7, further including instructions that, when executed, cause the user computing device to:
    store the encoded information derived from the at least one image and not store the at least one image.

9. A method, comprising:
    at an insurance system server including at least one processor, memory and a communication interface:
        receiving, by the at least one processor via the communication interface, a request for an insurance product;
        identifying, by the at least one processor, at least one image of a customer or potential customer requesting the insurance product to be used in determining an insurance policy factor, the identified at least one image including the customer or potential customer and an object having a known size;
        transmit instructions to capture the at least one image of the customer or potential customer, the transmitted instructions including transmitting an application to a user device including an image capture device;
        receive the at least one image of the customer or potential customer;
        convert the received at least one image to a silhouette of the customer or potential customer;
        prior to analyzing the converted at least one image, verify an identity of the customer or potential customer;
        analyze the converted at least one image to determine, by the at least one processor, a height and a weight of the customer or potential customer based on the at least one image; and
        determine, based, at least in part, on the determined height and weight, an insurance policy factor for the requested insurance product.

10. The method of claim 9, wherein the request for the insurance product is received from a user computing device of the customer or potential customer and wherein the user computing device of the customer or potential customer is used to capture the at least one image.

11. The method of claim 9, wherein the object having a known size is at least one of: a doorframe, a door and a vehicle.

12. The method of claim 9, further including:
determining, based on the height and weight determined from the at least one image, a body mass index of the customer or potential customer; and
determining the insurance policy factor based, at least in part, on the determined body mass index.

13. The method of claim 9, wherein verifying the identity of the customer or potential customer further includes:
receiving a captured image of a government issued identification; and
verifying the identity of the customer or potential customer by comparing the captured image of the government issued identification to additional information.

14. The method of claim 9, wherein the instructions to capture the at least one identified image include instructions to capture a plurality of images of the customer or potential customer and instructions regarding at least one of: body part to capture in at least one image, angle of capture of at least one image, and environment in which at least one image is captured.

15. The method of claim 14, wherein the instructions regarding a body part to capture include at least one of a full body image, a side image, and a head or face image.

16. The method of claim 9, further including:
encoding the received at least one image.

17. A non-transitory computer-readable medium storing computer-executable instructions that, when executed by an insurance system server comprising at least one processor, memory, and a communication interface, cause the insurance system server to:
receive a request for an insurance product;
identify at least one image of a customer or potential customer requesting the insurance product to be used in determining an insurance policy factor, the identified at least one image including the customer or potential customer and an object having a known size;
transmit, to a user computing device of the customer or potential customer, a request to capture the at least one image of the customer or potential customer;
receive, from the user computing device, the at least one image of the customer or potential customer;
convert the received at least one image of the customer or potential customer to a silhouette of the customer or potential customer;
receive, from a third party database, identity verification information of the customer or potential customer, the identity verification information including at least one image of the customer or potential customer;
determine, based on the converted at least one image and the received verification information, whether an identity of the customer or potential customer is verified;
responsive to determining that the identity of the customer or potential customer is not verified, transmitting a notification to the customer or potential customer providing further instructions to obtain the requested insurance product;
responsive to determining that the identity of the customer or potential customer is verified, processing the at least one image to determine a height and a weight of the customer or potential customer from the at least one image; and
determine, based on the height and the weight of the customer or potential customer, an insurance policy factor of the requested insurance product.

18. The non-transitory computer-readable medium of claim 17, further including instructions that, when executed, cause the insurance system server to:
determine, based on the height and weight determined from the at least one image, a body mass index of the customer or potential customer; and
determine the insurance policy factor based, at least in part, on the determined body mass index.

19. The non-transitory computer-readable medium of claim 17, wherein the insurance policy factor includes a premium of the insurance product.

20. The non-transitory computer-readable medium of claim 17, wherein the object having a known size is at least one of: a door frame, a door, and a vehicle.

* * * * *